March 1, 1966 W. F. M. GRAY ETAL 3,238,280
POROUS COATINGS FOR ELECTRICAL CONDUCTORS AND METHOD OF FORMING
Filed July 2, 1962 2 Sheets-Sheet 1

Inventors,
Willard F. M. Gray,
John L. McMurphy,
by Francis K. Doyle
Their Attorney.

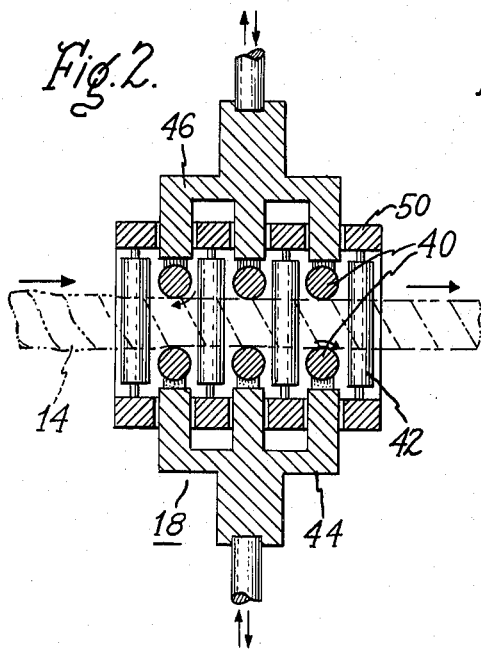
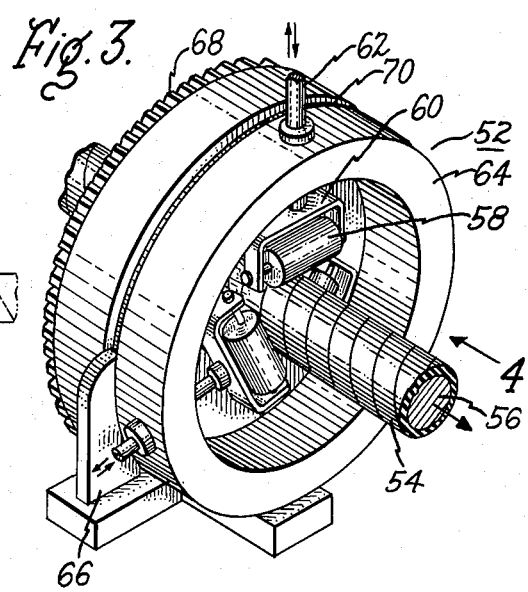
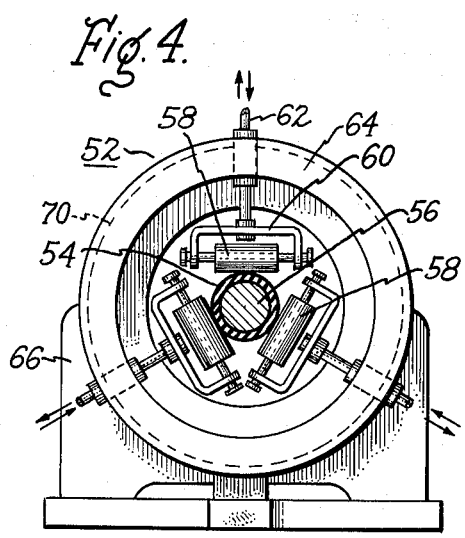
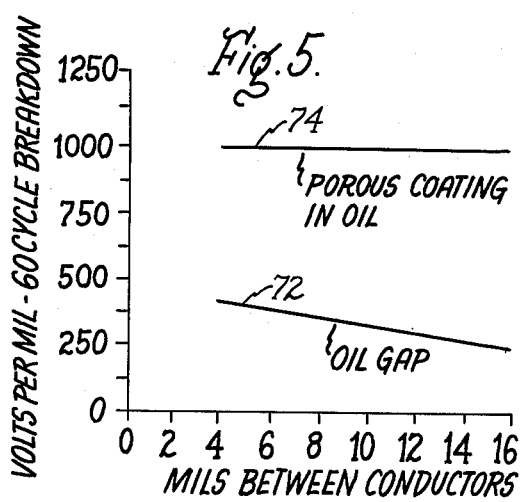

United States Patent Office 3,238,280
Patented Mar. 1, 1966

3,238,280
POROUS COATINGS FOR ELECTRICAL CONDUCTORS AND METHOD OF FORMING
Willard F. M. Gray, Hancock, and John L. McMurphy, Pittsfield, Mass., assignors to General Electric Company, a corporation of New York
Filed July 2, 1962, Ser. No. 206,945
5 Claims. (Cl. 264—103)

This invention relates to electrical conductors for use in fluid electrical apparatus and more particularly to the use of porous coatings on such electrical conductors, and to the method of forming such coatings.

It is well known to those skilled in the electrical apparatus art that fluid dielectric material is used in many such electrical apparatuses as an insulating medium. Some well-known fluids used as insulating mediums are various types of insulating gases, electrical grade mineral oil and various synthetic fluids such as diphenyl chloride. In various electrical apparatuses which utilize these dielectric fluids, the electrical conductors are generally provided with an insulating material which is coated on the wire to form a continuous insulating film about such wire. Various types of wire insulation are well known and include, among others, various types of enamels such as, for example, phenolic modified polyvinyl formal enamel. This insulating coating on the wire serves to insulate the adjacent turns of the wire from each other when such wire is wound into a coil. In general, the strength of the insulating film on the wire determines the amount of electrical voltage which can be carried by the wire. The thicker the insulating film about the wire, the greater will be the voltage which such wire can carry. However, with the continuous enamel films, the voltage gradient of such insulation usually decreases with an increase in thickness of the enamel. That is, the thicker the enamel film, the less electrical stress the film can withstand for each mil of thickness, even though the over-all electrical strength of the insulation will be increased. Thus, were it desired to double the electrical strength of a continuous film insulation, it would be necessary to increase its thickness by a factor of three or more.

It is also well known that continuous film insulations are relatively expensive to apply to wire. This is, of course, due to the expensive type of machinery necessary for coating such film on the wire, as well as to the expense of the materials used in such coating. Further, in applying continuous film insulation, the wire tends to become work-hardened due to the repeated flexing of the wire during the coating of such wire. As is well understood, in utilizing the various machines which are well known in the art to apply a continuous film on a wire, the wire is generally strung over a substantial number of pulleys and in carrying the wire through such machines, the wire is flexed repeatedly during the coating process. As will be understood, this repeated flexing of the wire tends to work-harden the wire, thereby making it less flexible and less readily formed into the desired coils. From the above it can be seen that there is presently a need in the fluid-filled electrical apparatus field for a coating for electrical conductors which will provide a substantial uniform voltage gradient, which will be relatively inexpensive, and which will not result in work-hardening of the wire.

An unexpected discovery has been made that by applying a porous, uniform coating of a material to a bare electrical conductor and using such coated conductor in a fluid-filled electrical apparatus that the porous coating will provide an excellent insulating medium and will also provide a substantially uniform voltage gradient for such electrical conductor. If the thickness of the porous coating is doubled, the dielectric strength of the insulating value in the fluid-filled system is substantially doubled. The material may be coated about the wire in any desired manner, although one preferred method of obtaining the desired porous, uniform coating is to braid the material on the wire. As used throughout this specification and claims, the term "braid" will be used to mean a process of serving any desired number of strands of material about a bare electrical conductor in one direction and weaving among the served strands at least one strand of material in the opposite direction to thereby tie down the served strands to the electrical conductor.

Other methods which may be used to place a uniform porous coating on a bare electrical conductor are serving, weaving, and knitting. Serving is merely the continuous wrapping of strands of filaments about a wire. Weaving is generally similar to braiding, while knitting is interlacing a filament or filaments by a series of connected loops. As used herein the term "uniform" means that the thickness of the coating on the wire is substantially the same throughout the length of the wire, and the openings in the coating are substantially the same between any two adjacent strands or filaments along the length of the wire.

While the exact reason for obtaining a good insulation by use of a porous, uniform coating of material and one which has a substantially uniform voltage gradient is not completely understood, it is believed that the insulation value is due to the dielectric fluid in which the porous coated electrical conductors are used. It is believed that the insulation strength of the fluid is increased within porous coatings due to the tortuous columns or channels of fluid which are formed in the porous material between adjacent conductors. Clearly, when the thickness of the porous coating is substantially doubled, the tortuous column or channel which is formed in the porous material is increased by a ratio which provides a substantially uniform voltage gradient.

The above-described discovery is disclosed and claimed in application Serial No. 135,194, filed August 31, 1961 in the name of W. F. M. Gray, and assigned to the same assignee as the present invention now Patent No. 3,132,-205. It has since been discovered that if the porous, uniform coating of material is flattened after it is coated on the wire, that a better dielectric strength may be obtained. Further, it has been found that larger filaments of material may be used, with higher coating speeds and still obtain the same dielectric strength as with smaller filaments of material. The improved results which are obtained by flattening out the coated material are believed to be the result of the smaller openings which are available between the filaments of material after the coating is flattened.

It is, therefore, one object of this invention to provide a coating for electrical conductors, for use in dielectric fluids which will have a substantially uniform voltage gradient.

Another object of this invention is to provide a coating for electrical conductors which may be applied to such conductors without work-hardening the conductors.

A further object of this invention is to provide a porous coating for electrical conductors for use in dielectric fluids where the insulation strength of such coating depends on the insulation strength of the dielectric fluid.

Still another object of this invention is to provide a porous coating for electrical conductors, which is applied to such conductors by an inexpensive process, such as braiding, weaving, knitting, or serving, and then flattening the porous coating.

A still further object of this invention is to provide a method of forming a porous insulating coating on electrical conductors.

Still a further object of this invention is to provide a method of forming an insulating coating on an electrical conductor having substantially uniform pores throughout the insulating coating.

In carrying out this invention in one form, a number of strands or filaments of material are wrapping about a bare electrical conductor to form a porous coating. The porous coated wire is then processed, in any desired manner, to flatten out such coating thereby reducing the build for the coating and decreasing the size of the pores in such coating.

The invention which is desired to be protected is specifically pointed out and distinctly claimed in the claims appended hereto. However, it is believed that this invention, and the manner in which its objects and advantages are obtained, as well as other objects and advantages thereof, will be better understood from the following detailed description especially when considered in the light of the accompanying drawings in which:

FIGURE 2 is a sectional view of the flattening device shown in FIG. 1, taken on the line 2—2 of FIG. 1;

FIGURE 3 is a perspective view of a device for flattening a porous coating on a round electrical conductor;

FIGURE 4 is a front view of the device shown in FIG. 3 taken in the direction of the arrow 4 in FIG. 3; and FIGURE 5 is a graph showing the voltage gradient of porous coated wire and bare wire in oil.

Figure 1:
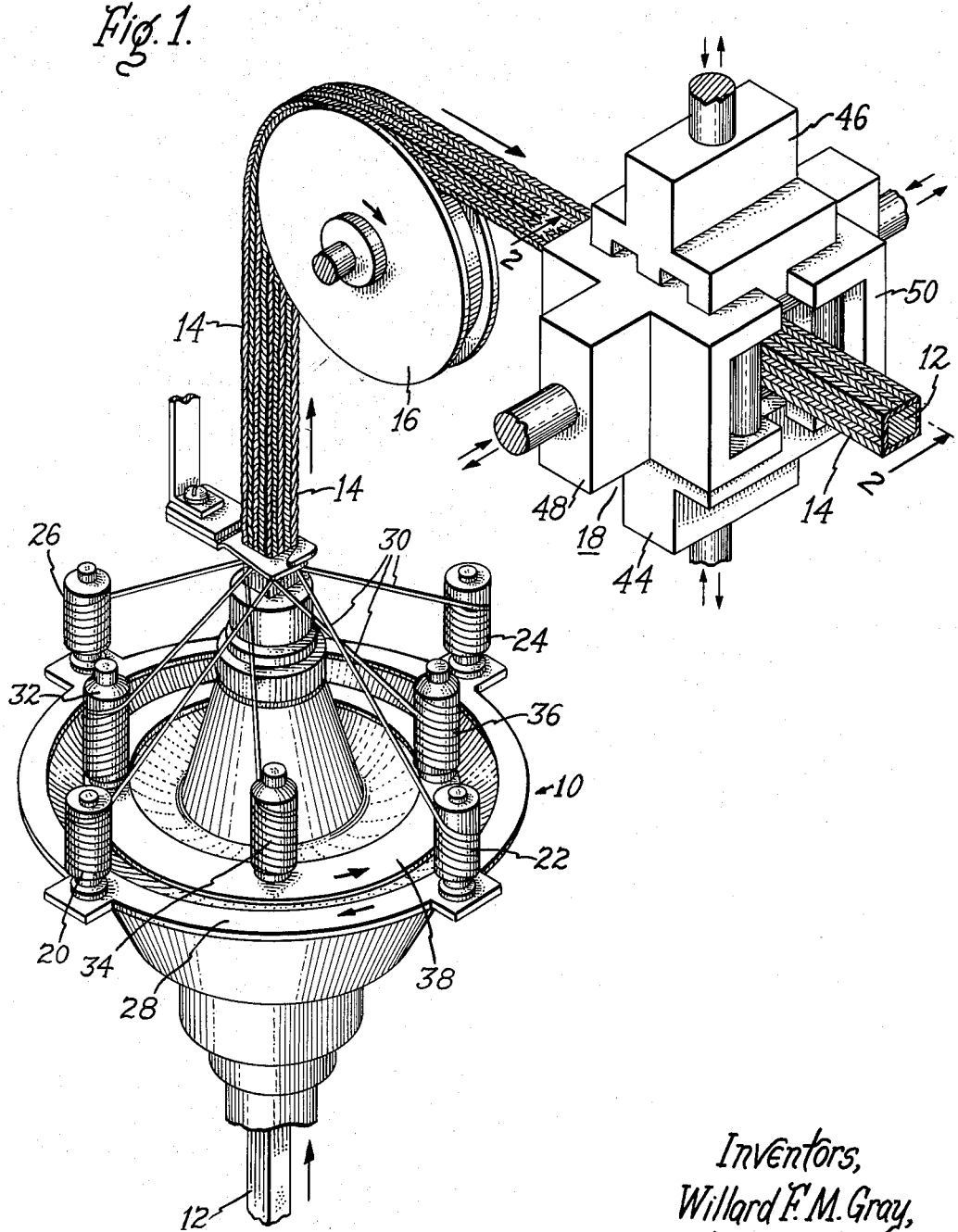
FIGURE 1 is a partial perspective view of one form of equipment which may be used to form a porous coating on a rectangular electrical conductor and flatten the coating.

Referring now to the drawings, in which like numerals are used to indicate like parts throughout the various views thereof, and with particular reference to FIG. 1, there is shown in perspective view a portion of one form of equipment which may be used to wrap a porous coating of material about a rectangular electrical conductor and flatten the coating on the rectangular electrical conductor. FIGURE 1 shows a perspective view of a braiding head 10 of a braiding machine, such as, for example, a Wardwell braiding machine manufactured by the Wardwell Braiding Machine Company of Central Falls, Rhode Island. Of course, other types of braiding machines may be used in this application, as desired. As shown in FIG. 1, a rectangular wire 12 is brought out from a storage reel (not shown) and enters through the lower portion of the braiding head 10. A porous coating 14 is wrapped about rectangular wire 12 by means of the braiding head 10. The porous coated wire then passes over a pulley 16 and is then directed to a flattening device 18 where the porous coating 14 is flattened on the wire 12, thereby reducing its build and decreasing the size of the pores in the coating 14. By means of this equipment, a porous coating may be rapidly wrapped about the conductor utilizing filaments of any desired size. After the coated material is flattened, by the device 18, a uniform coating 14 is obtained having substantially small pores between the various filaments utilized to form the coating 14.

As will be understood, the braiding head 10 may be utilized to either braid or serve the material in filament form about the rectangular conductor 14, as desired. As shown in FIG. 1, a braiding is utilized in which the outer four spools 20, 22, 24, and 26 are mounted on an outer rotatable ring 28 which rotates in a clockwise direction, as indicated by the arrow on the ring 28. Each of the spools 20, 22, 24, and 26 carries a filament material, indicated at 30, which is wrapped about the rectangular wire 12 in a clockwise direction. The inner spools, only three of which are shown indicated at 32, 34, and 36, are mounted on an inner ring 38 which rotates in a counter-clockwise direction as indicated by the arrow on ring 38. Each of spools 32, 34, and 36 also carries material in filament form, indicated by numeral 30, in the same manner as the spools 20, 22, 24, and 26. In a manner which is well known to those skilled in the braiding art, as the rings 28 and 38 rotate in opposite directions, the braiding head 10 causes the filaments on the inner spools 32, 34, and 36 to be interwoven among the filaments on the outer spools 20, 22, 24, and 26 to thereby braid the coating 14 about the rectangular conductor 12. Of course, it will be understood that in the various types of braiding machines a substantially larger number of spools may be provided on both the inner and outer rotatable rings, if desired. For example, in one type of braiding machine, each of the rotating rings is provided with eight separate spools, and the machine interweaves the filaments on each of the spools to braid sixteen strands of filament material on the wire. Of course, as desired, the material may be mounted only on the outer spools on outer ring 28 to thereby merely serve the material about the rectangular wire. In another coating all of the outer spools may be used with only a single spool on the inner ring. Any other combination may be used, as desired. Thus it can be seen that by means of a braiding head, such as indicated at 10 in FIG. 1, a number of strands of filament material may be served about the rectangular conductor 12 in one direction and a similar number of filament material may be served about the conductor in the opposite direction, interwoven among the filament material in one direction, or the material may be merely served about the conductor, or may be interwoven with any desired number of strands of filament material served on the conductor in an opposite direction. Thus, while for illustrative purposes, it has been shown four strands served in one direction with four strands served in the opposite direction and interwoven among the four strands in one direction, it will be understood that any desired number may be served in either direction, as desired.

Once the material is served or braided about the rectangular conductor 12 the coating is then moved through a flattening device 18 and onto a take-up spool or reel (not shown). In the flattening device 18 a number of rollers cooperate with the rectangular wire to flatten the coating 14 onto the wire 12, thereby providing a uniform coating on the wire having substantially uniform small pores throughout the entire coating.

Referring to FIG. 2 of the drawing, a sectional view of the flattening device 18 is shown to indicate the manner in which the coating 14 is flattened upon the rectangular wire 12. As shown in FIG. 2, the rectangular wire 12 with the coating 14 passes through the flattening device 18 between the rolls which are mounted in pairs in both a horizontal and a vertical direction to correspond to the flat sides of the rectangular wire. As shown in FIG. 2, three pairs of rollers 40 are provided in the horizontal direction above and below the rectangularly coated wire, while four pairs of rollers 42 are provided in the vertical direction. In FIG. 2 only one of each of the pairs of rollers in the vertical direction is shown, however, it will be understood that a similar roller is mounted on the opposite side of the rectangular wire to provide the desired flattening of the wire. Each of the pairs of rollers 40 are mounted for rotation in movable members 44 and 46 of the flattening device 18. As indicated by the arrows in FIGS. 1 and 2, the members 44 and 46 may be moved inwardly or outwardly of the device 18 to provide the desired distance between the pairs of rolls 40, depending, of course, upon the size of the rectangular wire 12 and the thickness of the coating 14 which is placed upon the wire by the braiding head 10. In a similar manner, the pairs of rolls 42 are mounted on opposite sides of device 18 in movable members 48 and 50, and members 48 and 50 are movable into and out of device 18 to provide the desired distance between the vertical rolls 42, as indicated by the arrows in FIG. 1. Thus it can be seen, that by means of the flattening device 18 any desired size of rectangular wire 12 having any thickness of coating 14 thereon may be brought through the flattening device 18 and the coating flattened to substantially reduce its build and at the same time to decrease the size of the pores in the coating on the wire.

Of course, it will be understood that if desired, a thermo plastic or a thermo setting filament may be utilized to form the porous coating 14 about the rectangular wire 12. In such instances it may also be desired to heat the porous coating to cause some flow between the various filaments to thereby further reduce the porous openings in the porous coating 14. In such instances, if desired, the pairs of rollers 40 and 42 may be heated in any desired manner to thereby provide heat to the thermo plastic or thermo setting coating about the wire 12 to cause some flow of the thermo plastic or thermo setting material to thereby further reduce the size of the pores.

Referring now to FIGS. 3 and 4 of the drawing, there is shown a flattening device 52 which may be utilized to flatten a coating 54 on a round wire 56. As will be understood, the braiding head 10 shown in FIG. 1 may similarly be utilized to form the porous coating on the round wire 56, either by braiding or serving, in the manner earlier indicated with reference to rectangular wire 12. After the round wire leaves the pulley 16, in the manner of the rectangular wire shown in FIG. 1, it is then brought in to the flattening device 52 where the porous coating 54 is substantially flattened by means of rollers 58 which are mounted within the flattening device 52. As shown in FIGS. 3 and 4, three rollers 58 are provided within the flattening device 52, each being mounted at 120° from the other about the circumference of the flattening device 52. As shown, each roller 58 is mounted in a yoke member 60 which is connected to a rod member 62. The rod members 62 may be moved into or out of the flattening device 52 to thereby increase or decrease the distance between the various rollers 58 within the flattening device 52, as indicated by the arrows in FIGS. 3 and 4. In this manner, the distance between the various rollers 58 may be varied to accommodate any desired size of wire 56 having any thickness of porous coating 54 formed thereon. In order to provide the desired flattening about the round wire 56, the ring member 64 of the flattening device 52 is rotatably mounted within support member 66, and may be rotated about support member 66 by means of the gear member 68 driven in any desired manner. The slot member 70 is provided in ring member 64 whereby the rotation of ring member 64 may be obtained about support member 66, as will be understood. Thus it will be clear that by means of flattening device 52 the porous coating 54 upon a round wire 56 may be readily flattened, regardless of the thickness of the coating 54 or size of the wire 56.

In the same manner as earlier mentioned with reference to the flattening device 18, when a thermo plastic or a thermo setting coating is utilized to form the porous coating 54 the rollers 58 may be heated to thereby provide some flow between the filaments of the thermoplastic or thermosetting material forming the coating 54 to thereby reduce the size of the pores formed in the porous coating 54.

Referring now to FIG. 5 of the drawing, there is shown in graph form the voltage gradient which may be obtained between bare wire in an oil gap and between porous coated wire immersed in oil by use of this invention. In FIG. 5, curve 72 shows the voltage gradient of bare wire in an oil gap. As there shown, the volts per mil of bare wire in an oil gap starts at a substantially low figure, less than 500 volts per mil, and as the distance between the conductors increases the voltage gradient decreases, as indicated. However, as shown by curve 74, when a porous coating is provided upon the electrical conductors and the conductors are immersed in an oil the voltage gradient remains substantially constant at substantially 1,000 volts per mil as the distance between the conductors, which in this instance means as the thickness of the porous coating, increases. Thus it can be seen that by means of this invention a porous coating is provided on electrical conductors whereby when the porous coating is immersed in a dielectric fluid, the coating provides an insulation on the conductors which provides a substantially uniform voltage gradient. As can be seen, the voltage gradient of the porous coating in the dielectric fluid is substantially higher than either the voltage gradient of the porous material, or of the dielectric fluid.

As has been indicated in the earlier-mentioned application Serial No. 135,194, in tests which have been made utilizing a porous coating in a dielectric fluid it has been found that where the openings of the porous coating exceed 3 mils in all dimensions, that the dielectric strength of the coating will fall below 1,000 volts per mil. However, where at least one dimension of the opening of the porous material is substantially 3 mils, then the dielectric strength of the porous coating is approximately 1,000 volts per mil. Further, where at least one dimension of the porous coating is less than 3 mils then the dielectric strength of the porous coating in a dielectric fluid is greater than 1,000 volts per mil. Thus by means of this invention a large filament material may be utilized to form the porous coating 14 or 54 upon a rectangular or round wire, and then the porous coating may be flattened by means of the device 18 or 52 to thereby obtain a uniform porous coating of less build and decrease the size of the pores in the coating to substantially 3 mils or less thereby obtaining a voltage gradient of substantially 1,000 volts per mil for the porous coating.

While there has been shown and described the present preferred embodiments of this invention, it will be obvious to those skilled in the art that various changes may be made in the constructional details of either the flattening devices or in the braiding head utilized, as desired. It will be apparent that all such changes may be made without departing from the spirit and scope of the invention as is defined in the claims appended hereto.

What is claimed as new and which it is desired to secure by Letters Patent of the United States is:

1. A method of forming a porous coating on an electrical conductor for use in fluid filled electrical apparatus wherein said coating will have a voltage gradient of at least 1,000 volts per mil comprising the steps of (1) wrapping a plurality of filaments of material about a bare electrical conductor, and (2) flattening said wrapped filaments to reduce their build and form a tight, porous coating about the electrical conductor, the pores of said coating being not more than 3 mils in at least one dimension.

2. A method of forming a porous coating on an electrical conductor for use in fluid filled electrical apparatus wherein said coating will have a voltage gradient of at least 1,000 volts per mil comprising the steps of (1) serving in one direction a plurality of filaments of material about the conductor and at least one filament of said material being served about the conductor in the opposite direction and interweaving said one filament among said plurality of filaments, and (2) flattening said served filaments to reduce their build and to form a tight, porous coating about the electrical conductor, the pores of said coating being not more than 3 mils in at least one dimension.

3. A method of forming a porous coating on a rectangular electrical conductor for use in fluid filled electrical apparatus wherein said coating will have a voltage gradient of at least 1,000 volts per mil which comprises the steps of wrapping a plurality of filaments of material about said rectangular conductor and flattening said wrapped filaments to reduce their build and form a tight, porous coating about said rectangular conductor, the pores of said coating being not more than 3 mils in at least one dimension.

4. A method of forming a porous coating on a round electrical conductor for use in fluid filled electrical apparatus wherein said coating will have a voltage gradient of at least 1,000 volts per mil which comprises the steps of (1) wrapping a plurality of filaments of material about said round electrical conductor, and (2) flattening said wrapped filaments to reduce their build and form a tight, porous coating about said round electrical conductor, the pores of said coating being not more than 3 mils in at least one dimension.

5. A method of forming a porous coating on an electrical conductor for use in fluid filled electrical apparatus wherein said coating will have a voltage gradient of at least 1,000 volts per mil comprising the steps of (1) wrapping a plurality of filaments of thermo plastic material about a bare electrical conductor, and (2) flattening said wrapped filaments by heated rollers which causes flow between said filaments to reduce their build and form a tight, porous coating about the electrical conductor, the pores of said coating being not more than 3 mils in at least one dimension.

References Cited by the Examiner

UNITED STATES PATENTS

| 1,747,769 | 2/1930 | Fullman et al. | |
| 1,895,400 | 1/1933 | Reeves | 57—162 |
| 1,990,337 | 2/1935 | Lewis et al. | 57—162 |
| 2,195,998 | 4/1940 | Race | 156—56 |
| 2,686,451 | 8/1954 | Shafer | 174—110 X |
| 2,732,422 | 1/1956 | Rapp | 174—121 |
| 3,132,205 | 5/1964 | Gray | 174—124 |

ROBERT K. SCHAEFER, *Primary Examiner.*

JOHN P. WILDMAN, E. JAMES SAX, JOHN F. BURNS, *Examiners.*

W. F. ZAGURSKI, D. A. KETTLESTRINGS,
*Assistant Examiners.*